(12) United States Patent
Reed et al.

(10) Patent No.: US 10,599,531 B2
(45) Date of Patent: Mar. 24, 2020

(54) USING DATA SET COPIES FOR RECOVERY OF A DATA SET IN EVENT OF A FAILURE

(71) Applicant: INTERNATIONAL BUSINESS MACHINES CORPORATION, Armonk, NY (US)

(72) Inventors: Thomas C. Reed, Tucson, AZ (US); David C. Reed, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 15/898,230

(22) Filed: Feb. 16, 2018

(65) Prior Publication Data

US 2019/0258550 A1    Aug. 22, 2019

(51) Int. Cl.
| | |
|---|---|
| G06F 11/00 | (2006.01) |
| G06F 11/14 | (2006.01) |
| G06F 3/06 | (2006.01) |
| G06F 21/60 | (2013.01) |
| G06F 11/07 | (2006.01) |

(52) U.S. Cl.
CPC ........ *G06F 11/1469* (2013.01); *G06F 3/0619* (2013.01); *G06F 11/0727* (2013.01); *G06F 21/604* (2013.01)

(58) Field of Classification Search
CPC .. G06F 11/1469; G06F 11/0727; G06F 11/08; G06F 11/14; G06F 11/1446; G06F 11/1448; G06F 11/1451; G06F 11/1458; G06F 3/0619; G06F 3/0614; G06F 21/604; G06F 2201/84; G06F 16/176; G06F 16/1767; G06F 16/1774; G06F 16/178
See application file for complete search history.

(56) References Cited

U.S. PATENT DOCUMENTS

| | | | |
|---|---|---|---|
| 5,403,639 A | * | 4/1995 | Belsan ................... G06F 16/10 |
| 7,117,229 B2 | | 10/2006 | Marshall et al. |
| 8,458,134 B2 | * | 6/2013 | Benhase ............ G06F 11/1448 |
| | | | 707/610 |
| 9,251,231 B2 | * | 2/2016 | Benhase ............ G06F 11/2082 |

(Continued)

FOREIGN PATENT DOCUMENTS

CN    106648991    5/2017

OTHER PUBLICATIONS

English translation of CN106648991 dated May 10, 2017, pp. 9.

(Continued)

*Primary Examiner* — Anthony J Amoroso

(74) *Attorney, Agent, or Firm* — David W. Victor; Konrad Rayness Davda & Victor LLP

(57) ABSTRACT

Provided are a computer program product, system, and method to use data set copies for recovery of a data set in event of a failure. In response to an update to the data set, a determination is made of an update group to include at least one copy of the data set that was not in a last determined update group to which a previous update was applied and to exclude at least one copy of the data set that was in the last determined update group. The update to the data set is applied to the copies of the data set in the update group and not applied to the copies not in the update group. In response to a failure event, the data set is recovered from one of the copies of the data set in the update group or not in the update group.

24 Claims, 4 Drawing Sheets

(56) References Cited

U.S. PATENT DOCUMENTS

| | | | | |
|---|---|---|---|---|
| 10,372,548 | B2* | 8/2019 | Brown | G06F 11/1448 |
| 2007/0156983 | A1* | 7/2007 | Kern | G06F 11/2064 |
| | | | | 711/162 |
| 2012/0254122 | A1* | 10/2012 | Benhase | G06F 11/1448 |
| | | | | 707/649 |
| 2014/0006853 | A1* | 1/2014 | Dudgeon | G06F 11/1435 |
| | | | | 714/15 |
| 2014/0108753 | A1* | 4/2014 | Benhase | G06F 11/2082 |
| | | | | 711/162 |
| 2014/0380097 | A1* | 12/2014 | Dudgeon | G06F 11/1435 |
| | | | | 714/21 |
| 2015/0324416 | A1* | 11/2015 | Ishii | G06F 9/5061 |
| | | | | 707/694 |
| 2016/0335164 | A1* | 11/2016 | Dudgeon | G06F 11/1435 |
| 2017/0075573 | A1 | 3/2017 | Carpenter et al. | |
| 2017/0124002 | A1 | 5/2017 | Bohling et al. | |
| 2018/0137017 | A1* | 5/2018 | Brown | G06F 11/1448 |

OTHER PUBLICATIONS

A. Basu, "Microsoft SQL Server and SnapManager for SQL on NetApp Storage Best Practices Guide", Jan. 2012, pp. 92.

T. Chien, et al., "Very Large Database (VLDB) Backup & Recovery Best Practices", Oracle, Jul. 2008, pp. 27.

"Defining Coupling Facility Components in a Sysplex", pp. 3, [online][Retrieved Feb. 9, 2018] https://www.ibm.com/support/knowledgecenter/en/SSLTBW_2.1.0/com.i.

"Defining Sharing Control Data Sets", pp. 3, [online][Retrieved Feb. 9, 2018] https://www.ibm.com/support/knowledgecenter/en/SSLTBW_2.2.0/com.i.

M Lovelace, et al., "VSAM Demystified", IBM Corporation, Red Paper Document SG24-6105-02, Mar. 2013, pp. 458.

"Recovering Shared Control Data Set", pp. 3, [online][Retrieved Feb. 9, 2018] https://www.ibm.com/support/knowledgecenter/en/SSLTBW_2.3.0/com.i . . . 1 of.

Wikipedia, "Coupling Facility", May 2016, pp. 2, [online][Retrieved Feb. 9, 2018] https://en.wikipedia.org/wiki/Coupling_Facility.

K. Winnard, et al., "IBM z/OS DFSMShsm Primer", BM Corporation, Red Paper Document SG24-5272-03, Sep. 2015, pp. 498.

English translation of CN106648991 dated May 10, 2017, Translation document submitted and considered as part of Nov. 7, 2019 IDS.

\* cited by examiner

Control Data Set Management Information

USING DATA SET COPIES FOR RECOVERY OF A DATA SET IN EVENT OF A FAILURE

BACKGROUND OF THE INVENTION

1. Field of the Invention

The present invention relates to a computer program product, system, and method to use data set copies for recovery of a data set in event of a failure.

2. Description of the Related Art

In a shared storage environment, a server or coupling facility may allow multiple connected processing systems to share records in a shared storage. In a Parallel Sysplex® shared computing environment, provided by International Business Machines Corporation ("IBM"), the coupling facility maintains control data sets referred to as sharing control data sets (SHCDS) having information to manage shared access to records in a shared storage. (Parallel Sysplex is a registered trademark of IBM throughout the world). The coupling facility may maintain multiple copies of the SHCDS in case one of the copies becomes corrupted if a disaster interrupts an update to the SHCDS. For instance, the coupling facility may maintain two active copies and one spare copy for recovery purposes. The spare SHCDS is used when Input/Output (I/O) errors occur on the active SHCDS. Any one of the two active and one spare copies of the SHCDS may be used for data recovery.

There is a need in the art for improved computer technology for managing data sets for disaster recovery purposes.

SUMMARY

Provided are a computer program product, system, and method to use data set copies for recovery of a data set in event of a failure. A plurality of copies of a data set receive updates from at least one processing system. In response to an update to the data set, a determination is made of an update group to include at least one copy of the data set that was not in a last determined update group to which a previous update was applied and to exclude at least one copy of the data set that was in the last determined update group. The update to the data set is applied to the copies of the data set in the update group, wherein updates are not applied to the copies of the data set not in the update group. In response to a failure event, a determination is made as to whether to recover the data set from one of the copies of the data set in the update group or one of the copies of the data set not in the update group.

DETAILED DESCRIPTION

During a failure, updates to the control data sets may become interrupted, leaving the control data sets in a corrupted state. In such case, a fallback procedure may have to be performed to purge control information, such as locking information, and rebuild the control data sets, which may require manual intervention which can delay the disaster recovery startup.

Described embodiments provide improvements to the computer technology for managing copies of control data sets in a shared computing environment to reduce the downtime if control data sets become corrupted during an update or other I/O operation. In described embodiments, in response to an update to a data set, such as a control data set, an update group is determined to include a plurality of the copies of the data set including at least one copy of the data set that was not in a last determined update group to which a previous update was applied and excluding at least one copy of the data set that was in the last determined update group. The update is then applied to the copies of the data set in the update group, and not applied to those copies of the data set not in the update group. In response to a failure, the data set may be recovered from one of the copies in the update group or that is not in the update group.

With the described embodiments, the copies of the data set not in the update group are one or more versions behind the current version, but comprise stable copies that would not be corrupted by an interruption to an update to the data set copies in the update group, because the update is only applied to those data set copies within the update group, and not outside of the update group. In this way, if the data set copies in the update group become corrupted as a result of an interrupted update to the data set copies, one of the data set copies outside of the update group may be used for data recovery, and only recent transactions need to be applied to the data set copy outside of the update group to make it current.

Figure 1:
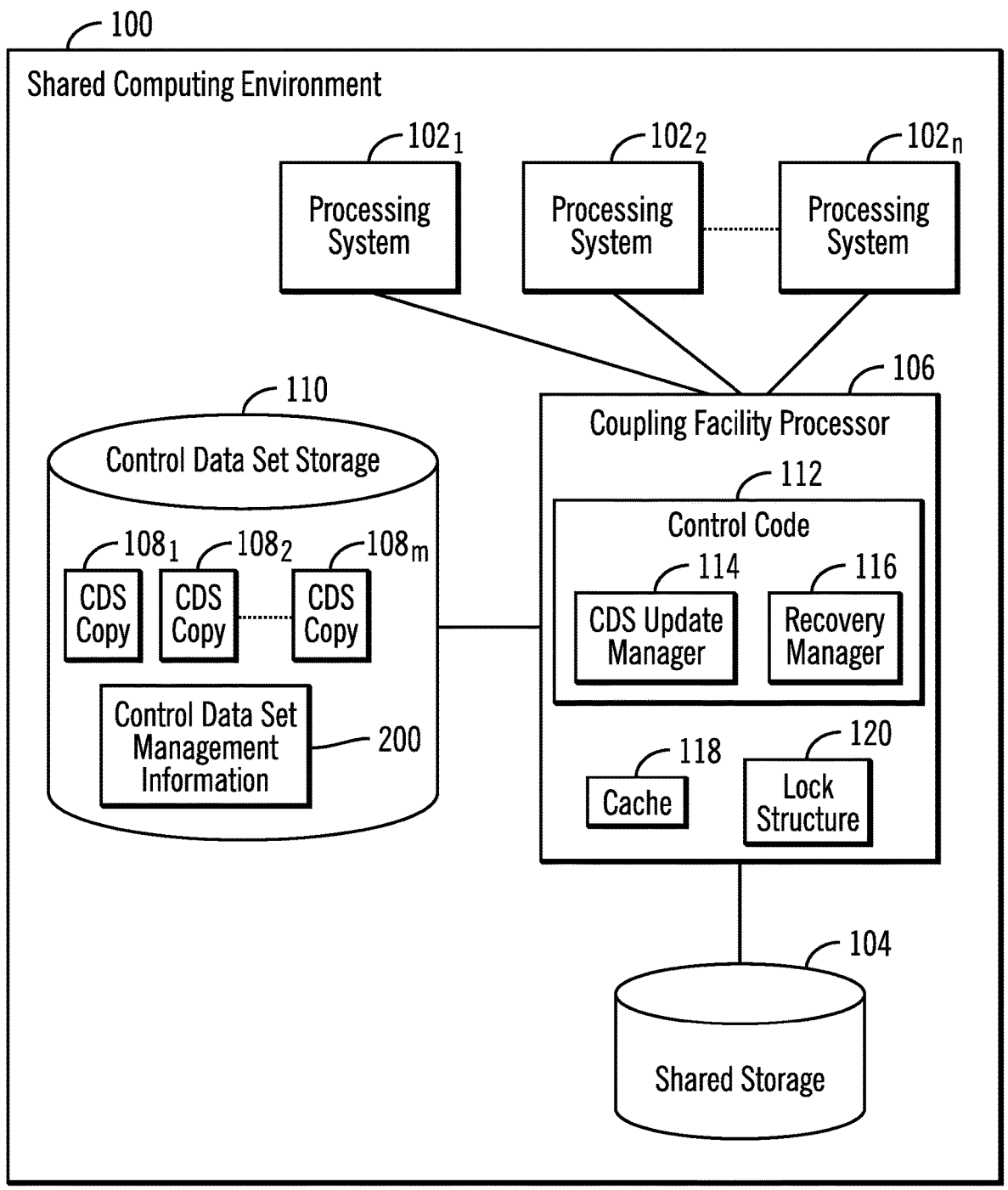
FIG. 1 illustrates an embodiment of a shared storage computing environment.

FIG. 1 illustrates an embodiment of a shared computing environment 100 including a plurality of processing systems $102_1, 102_2 \ldots 102_n$ each implementing a separate operating system to access shared storage 104 via a coupling facility 106 (or other type of server) that manages shared access to the shared storage 104. The coupling facility 106 maintains a control data set having information to maintain data integrity of records in the shared storage 104 and to manage data sharing, such as record level sharing, among the processing systems $102_1, 102_2 \ldots 102_n$. The coupling facility 106 maintains multiple data set copies $108_1, 108_2 \ldots 108_m$ in a control data set storage 110 comprising copies of the control data set, which may be at different version levels, and control data set management information 200 to manage the data set copies $108_1, 108_2 \ldots 108_m$ for recovery in the event of a failure.

The coupling facility 106 has control code 112, comprising an operating system and other programs, to manage access to the shared storage 104. The control code 112 includes a control data set update manager 114 to manage updates to the data set copies $108_1, 108_2 \ldots 108_m$ and a recovery manager 116 to recover the control data set from the data set copies $108_1, 108_2 \ldots 108_m$. The coupling facility 106 includes a cache 118 to store shared data and control block structures for the processing systems $102_1, 102_2 \ldots 102_n$ and a lock structure 120 having global locks to serialize access at record level.

The processing systems $102_1, 102_2 \ldots 102_n$ and coupling facility 106 may be implemented in separate computing or hardware devices, or comprise virtual servers, such as Logical Partitions (LPARs). Control data set copies $108_1, 108_2 \ldots 108_m$ are provided. In one implementation where the computing environment 100 comprises a Parallel Sysplex® from IBM, the shared storage may comprise Virtual Storage Access Method (VSAM) data sets; the control data sets copies $108_1$, $108_2$ . . . $108_m$ may comprise Sharing Control Data Sets (SHCDs) providing critical information used for record level sharing of the VSAM data sets, including a list of subsystems and their status, open data sets using the coupling facility 106, etc.; the SHCD copies may include active and spare copies, such as two sets of two active copies and one spare copy, or six copies; the processing systems $102_1$, $102_2$ . . . $102_n$ may include the Z/OS® operating system having an SMSVSAM address space to coordinate sharing. (Z/OS is a registered trademark of IBM throughout the world). In alternative embodiments, the control data set copies and components may be implemented in systems and shared computing environments from other vendors.

In one embodiment, the control data set copies may comprise copies of user data sets, not control information.

The storages 104 and 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storages 104 and 110 may comprise heterogeneous storage devices from different vendors and different types of storage devices, such as a first type of storage devices, e.g., hard disk drives, that have a slower data transfer rate than a second type of storage devices, e.g., SSDs.

Figure 2:
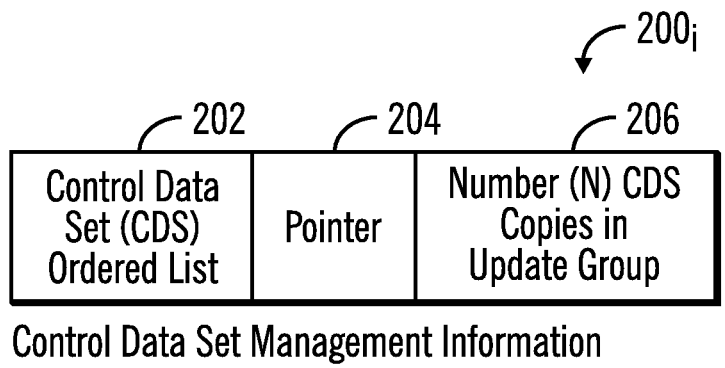
FIG. 2 illustrates an embodiment of a control data set management information.

FIG. 2 illustrates an embodiment of the control data set management information 200 as including control data set (CDS) ordered list 202 providing an ordering of the control data sets copies $108_1$, $108_2$ . . . $108_m$ in the storage 110; a pointer 204 pointing to one of the control data set copies in the ordered list 202 at which an update group or update window begins; and a number (N) of CDS copies in an update group 206. An update to the control data set is applied to all the CDS copies in an update group, and not applied to those CDS copies not determined to be in the update group. Thus, the update group comprises the N control data set copies $108_i$ . . . $108_{i+N}$ indicated in the ordered list 202 starting from the control data set $108_i$ addressed by the pointer 204.

Figure 3:
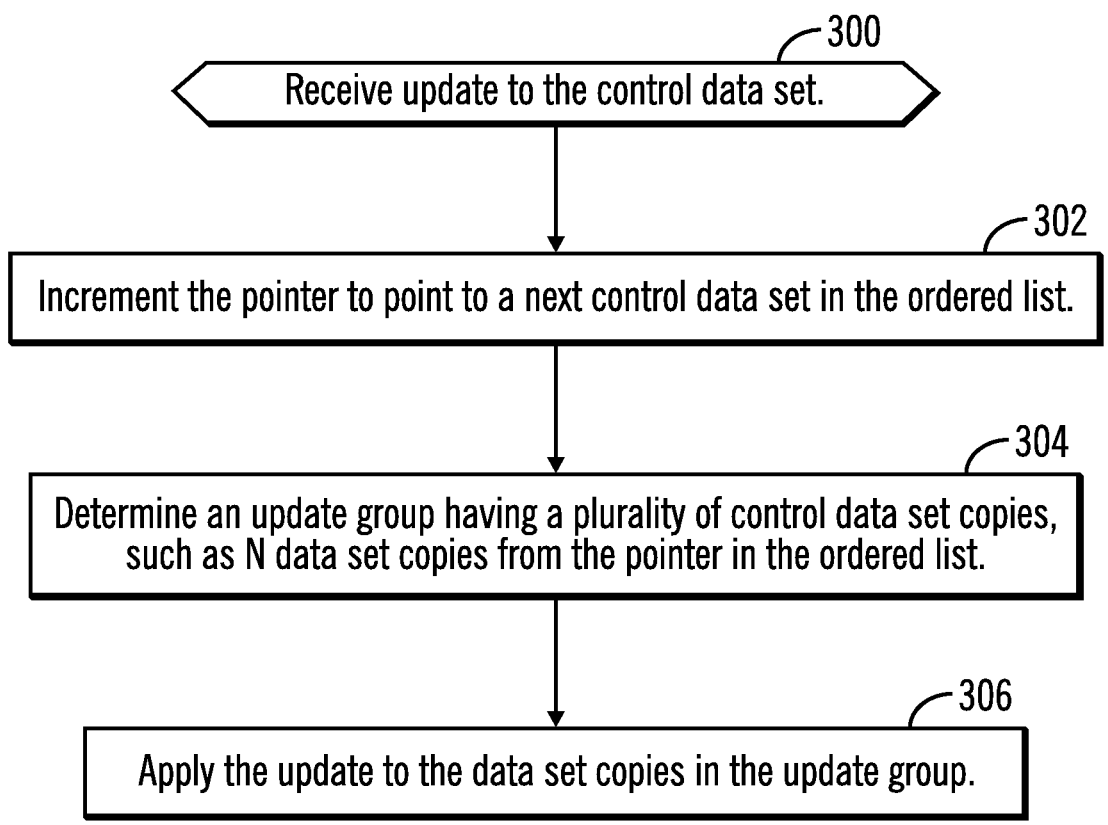
FIG. 3 illustrates an embodiment of operations to apply an update to a control data set.

FIG. 3 illustrates an embodiment of operations performed by the update manager 114 to process an update to the control data set. Upon receiving (at block 300) an update to the control data set, the pointer 204 is incremented (at block 302) to point to a next entry in the ordered list 202 identifying one of the data set copies $108_i$. If the pointer 204 is at the last entry in the ordered list 202, then moving the pointer to a next entry would move the pointer 204 to the first entry in the ordered list 202. During initialization, the pointer 204 may be set to point to the first control data set $108_1$ indicated in the ordered list 202. The update manager 114 determines (at block 304) an update group having a plurality of control data set copies, such as N data set copies from the pointer 204 in the ordered list 202, or control data set copies $108_i$ . . . $108_{i+N}$. The update for the control data set is applied (at block 306) to the control data set copies $108_i$ . . . $108_{i+N}$ in the update group. If the pointer 204 points to a control data set $108_j$ in the ordered list 202, such that the number of remaining entries in the ordered list 202 from entry $108_j$ is less than N, i.e., m−j<N, then the update group would include control data sets $108_i$ . . . $108_{i+N}$ and control data sets from the beginning of the list, at $108_1$, to fill the remainder of the number (N) in the update group 206, such as entries $108_1$ . . . $108_{N-(m-j)}$. In this way, the update group includes entries $108_j$ . . . $108_m$, $108_1$ . . . $108_{N-(m-j)}$.

With the embodiment of FIG. 3, updates are applied to a subset of the control data set copies $108_i$ . . . $108_{i+N}$ in the determined update group but not to data set copies $108_j$ not in the update group. Further, the update group comprises a sliding window that is shifted in the ordered list 202 before applying the update, and that may wrap around to the beginning of the list. The update group is shifted so that the next update group includes a plurality of copies of the data set including one data set copy not in the last update group that was updated and excluding at least one data set copy that was in the last update group. After the update is applied, only the data set copies $108_i$, . . . $108_{i+N}$ (or $108_j$ . . . $108_m$, $108_1$ . . . $108_{N-(m-j)}$) in the update group are at a current version level and data set copies outside of the update group are one or more versions behind a current version. In a disaster scenario, the data set copies $108_i$ . . . $108_{i+N}$ (or $108_j$ . . . $108_m$, $108_1$, . . . $108_{N-(m-j)}$) within the update group are considered potentially volatile or corrupted if the update to the data set copies $108_i$ . . . $108_{i+N}$ (or $108_j$ . . . $108_m$, $108_1$ . . . $108_{N-(m-j)}$) is interrupted leaving one or more of the data set copies $108_i$ . . . $108_{i+N}$ corrupted, whereas the data set copies outside of the current update group are valid, although at a lower version than a current version of the data set.

Figure 4:
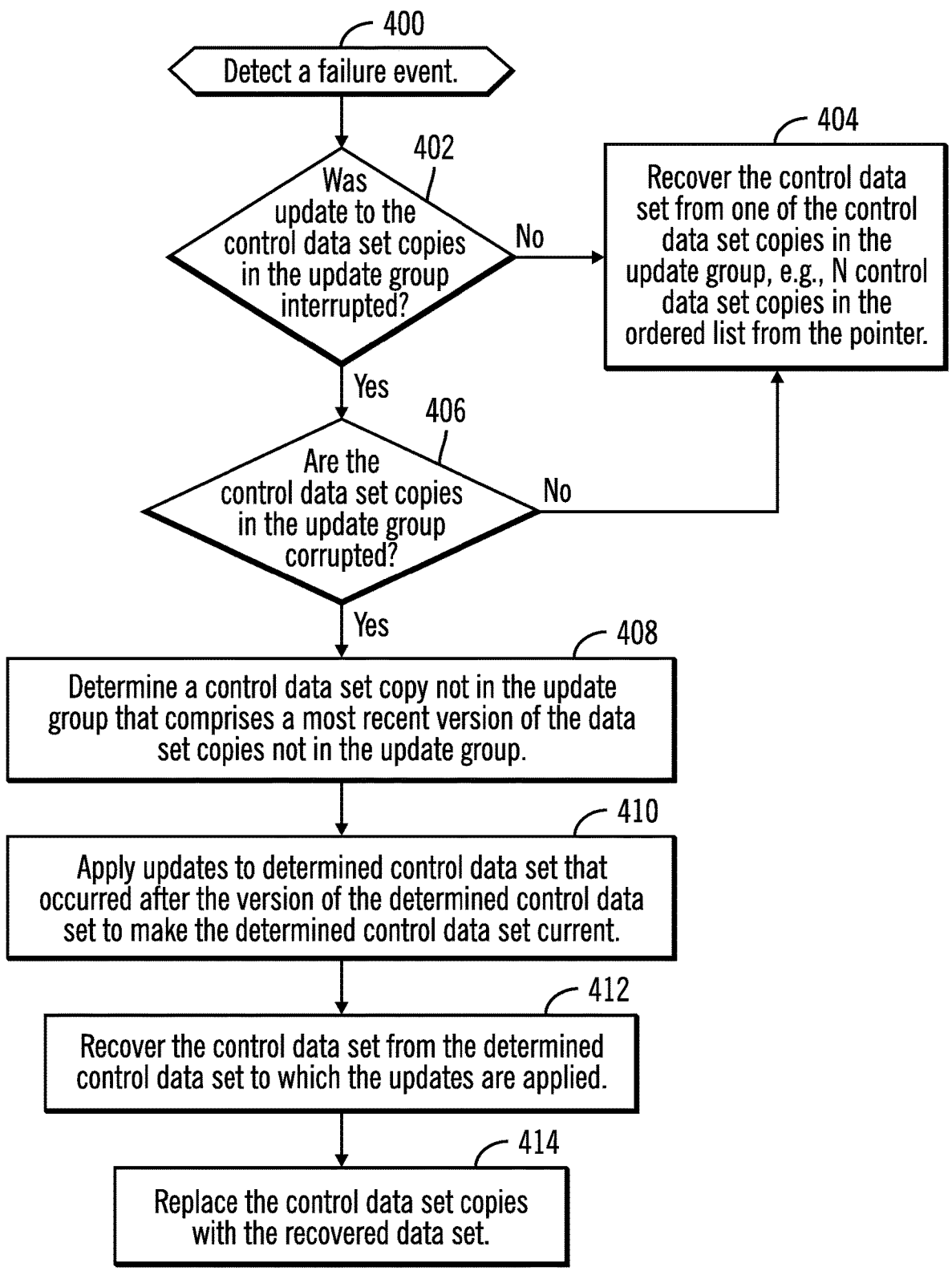
FIG. 4 illustrates an embodiment of operations to handle a failure event.

FIG. 4 illustrates an embodiment of operations performed by the recovery manager 116 in response to some detected failure or disaster event that requires recovery of the control data set from one of the control data sets copies $108_1$, $108_2$ . . . $108_m$. In response to a failure event (at block 400), a determination is made (at block 402) whether an update to the control data set copies in the update group was interrupted. If not, then the control data set may be recovered from one of the control data sets copies $108_1$, $108_2$ . . . $108_m$ in the update group, such as N control data set copies in the ordered list 202 from the pointer 204. If (at block 402) the update was interrupted, then the recovery manager 116 determines (at block 406) whether the control data set copies $108_i$ . . . $108_{i+N}$ (or $108_j$ . . . $108_m$, $108_1$ . . . $108_{N-(m-j)}$) within the update group are corrupted. This determination may be made by comparing the data set copies within the update group, and if they are identical, they may be deemed not corrupted, whereas if they are not identical, they may be considered corrupted. Corruption may occur if the update was interrupted while applying the update to the control data set copies within the update group. If (at block 406) the control data set copies within the update group are not corrupted, then control proceeds to block 404 to recover the control data set from one of the control data set copies within the update group.

If (at block 406) the control data set copies $108_i$ . . . $108_{i+N}$ (or $108_j$ . . . $108_m$, $108_1$ . . . $108_{N-(m-j)}$) in the update group are corrupted, then the disaster recovery manager 114 determines (at block 408) a control data set copy $108_k$ not in the update group that comprises a most recent version of the data set copies not in the update group. The disaster recovery 114 applies (at block 410) any updates to the determined control data set copy $108_k$ that occurred after the version of the determined control data set $108_j$ to make the determined control data set $108_k$ at the level of the current version. The transactions may be applied from a log or the processing systems $102_1, 102_2 \ldots 102_n$ may redrive the transactions. The data control data set is then recovered (at block 412) from the determined control data set $108_k$ to which the missing updates are applied. The other control data set copies $108_1, 108_2 \ldots 108_m$ may be replaced by the updated control data set $108_k$ so all the data set copies $108_1, 108_2 \ldots 108_m$ are at the current version level as a result of recovery.

In an alternative embodiment, if the update to the control data set was interrupted (at block 402), then control may proceed directory to block 408 to use a control data set copy outside of the update group, without performing the check to determine whether the control data set copies in the update group are corrupted.

With described embodiments, a position pointer or counter is used with the control data set copies to make two determinations, first, the current position of the update group or window to which updates are to be applied and, second, a determination whether or not the last update was interrupted and thus the control data set needs to be recovered from non-volatile control data sets not in the update group.

When system operation is interrupted due to a disaster event, there is the possibility that applying the update to the control data sets in the update group does not complete. In such case, the position counter and a determination of whether the update was interrupted indicates whether or not at the time of the disaster the update was completed for the volatile set of control data set copies within the update group. If an update was not initiated for the update group, i.e., volatile set, and the position counter points to the update group, then the data set copies in the update group are known to be valid and may be used for disaster recovery. If the update has been initiated to the volatile control data set copies in the update group, then an assumption can be made that the data set copies in the update group are corrupted. In such case, the volatile data set copies in the update group are discarded and the control data set reverts to the most recently updated data set copy outside of the update group. With the described embodiments, the entire control data set does not have to be recovered, but only the most recent updates applied after the version of the most current control data set copy outside of the update group. Thus, if the most current control data set copy outside of the update group is only one transaction behind the current version, then only that most recent transaction needs to be applied to the previous version of the control data set copy outside of the update group to make current. With these embodiments, there is no need to rebuild the entire control data set from previously applied transactions. In this way, described embodiments provide for substantially faster recovery of the control data set copy by only applying those transactions that occurred after the version of the control data set copy or by using the current version of the control data set if the copies of the control data set in the update group are not corrupted.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the processing systems $102_1$, $102_2$ . . . $102_n$ and the coupling facility processor 106 may be implemented in one or more computer systems, such as the computer system 502 shown in FIG. 5. Computer system/server 502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

Figure 5:
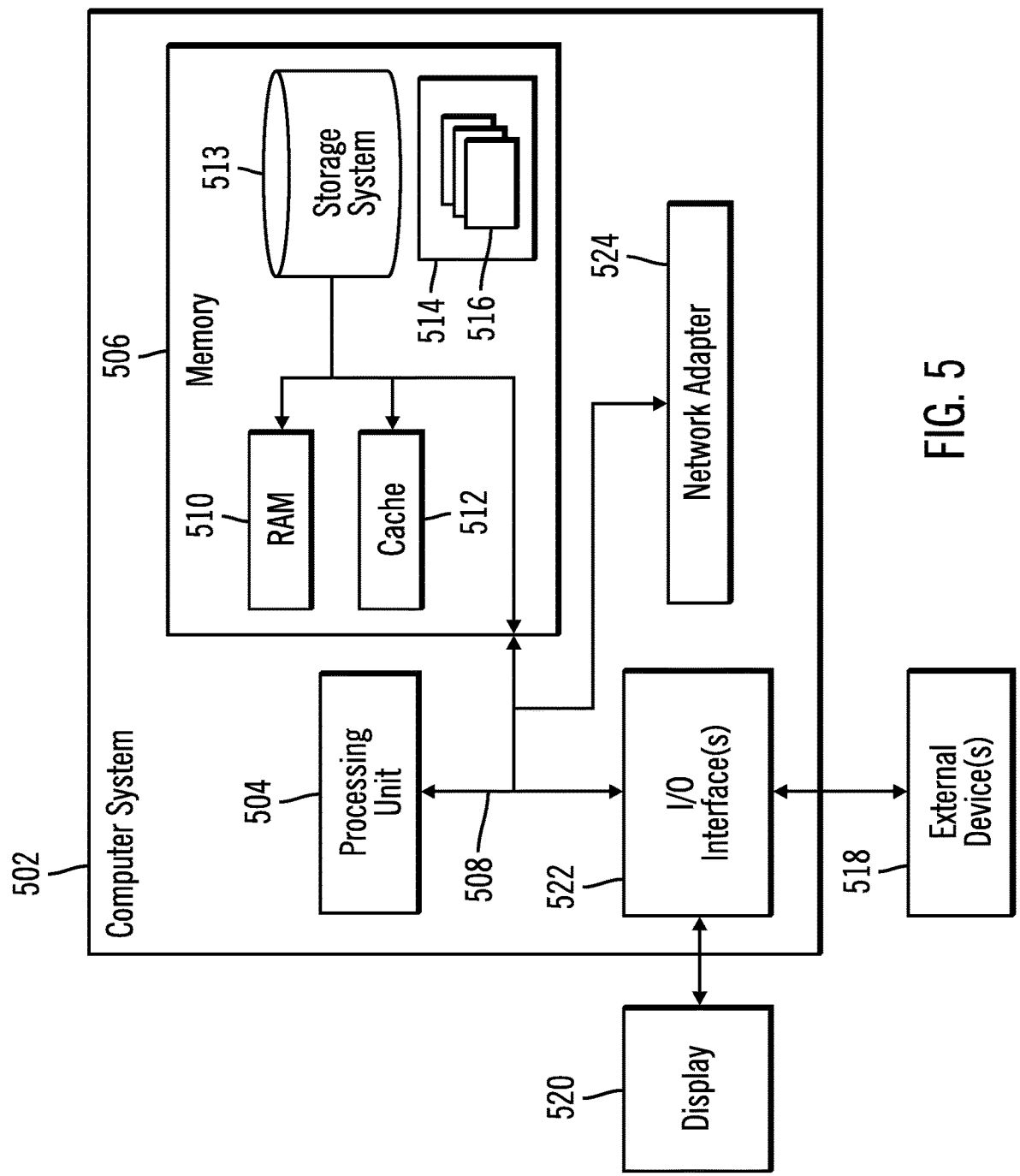
FIG. 5 illustrates an embodiment of a computer architecture used with described embodiments.

As shown in FIG. 5, the computer system/server 502 is shown in the form of a general-purpose computing device. The components of computer system/server 502 may include, but are not limited to, one or more processors or processing nodes 504, a system memory 506, and a bus 508 that couples various system components including system memory 506 to processor 504. Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 513 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces. As will be further depicted and described below, memory 506 may include at least one program product having a set (e.g., at least one) of program modules that are configured to carry out the functions of embodiments of the invention.

Program/utility 514, having a set (at least one) of program modules 516, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. The components of the computer 502 may be implemented as program modules 516 which generally carry out the functions and/or methodologies of embodiments of the invention as described herein. The systems of FIG. 1 may be implemented in one or more computer systems 502, where if they are implemented in multiple computer systems 502, then the computer systems may communicate over a network.

Computer system/server 502 may also communicate with one or more external devices 518 such as a keyboard, a pointing device, a display 520, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 522. Still yet, computer system/server 502 can communicate with one or more networks such as a local area network (LAN), a general wide area network (WAN), and/or a public network (e.g., the Internet) via network adapter 524. As depicted, network adapter 524 communicates with the other components of computer system/server 502 via bus 508. It should be understood that although not shown, other hardware and/or software components could be used in conjunction with computer system/server 502. Examples, include, but are not limited to: microcode, device drivers, redundant processing nodes, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for maintaining backup copies of a data set, the computer program product comprising a computer readable storage medium having computer readable program code embodied therein that is executable to perform operations, the operations comprising:

storing a plurality of copies of a data set receiving updates from at least one processing system;

in response to an update to the data set, determining an update group to include at least one copy of the data set that was not in a last determined update group to which a previous update was applied and to exclude at least one copy of the data set that was in the last determined update group;

applying the update to the data set to the copies of the data set in the update group, wherein updates are not applied to the copies of the data set not in the update group; and in response to a failure event, determining whether to recover the data set from one of the copies of the data set in the update group or one of the copies of the data set not in the update group.

2. The computer program product of claim 1, wherein the operations further comprise:

in response to recovering the data set from a recovered copy of the data set comprising one of the copies of the data set not in the update group, applying at least one previous update to the recovered copy of the data set to bring the recovered copy of the data set to a current version of the data set.

3. The computer program product of claim 1, wherein the determining the update group is performed in response to receiving the update and before applying the update to the copies of the data set in the update group.

4. The computer program product of claim 1, wherein the determining whether to recover the data set from one of the copies in the update group or not in the update group comprises performing in response to the failure event:

determining whether the applying the update to the data set was interrupted;

recovering the data set from one of the copies of the data set in the update group in response to determining that the applying the update to the data set was not interrupted; and recovering the data set from one of the copies of the data set not in the update group in response to determining that the applying the update to the data set was interrupted.

5. The computer program product of claim 1, wherein the determining whether to recover the data set from one of the copies in the update group or not in the update group comprises performing in response to the failure event:

determining whether the applying the update to the data set was interrupted;

in response to determining that the update was interrupted, determining whether the copies of the data set in the update group are corrupted;

recovering the data set from one of the copies of the data set in the update group in response to determining that the copies of the data set in the update group are not corrupted; and recovering the data set from one of the copies of the data set not in the update group in response to determining that the copies of the data set in the update group are corrupted.

6. The computer program product of claim 5, wherein the determining whether the copies of the data set in the update group are corrupted comprises:

determining whether the copies of the data set in the update group are identical copies;

determining that the copies of the data set are corrupted in response to determining that the copies of the data set in the update group are not identical; and determining that the copies of the data set are not corrupted in response to determining that the copies of the data set in the update group are identical.

7. The computer program product of claim 1, wherein the operations further comprise:

in response to determining to recover the data from one of the copies of the data set not in the update group, determining a copy of the data set not in the update group that comprises a most current version of the copies of the data set not in the update group, wherein the data set is determined from the copy comprising the most current version of the copies of the data set not in the update group.

8. The computer program product of claim 1, wherein the copies of the data set are indicated in an ordered list, wherein the determining the update group comprises:

determining a number of copies of the data set from a pointer to one of the copies of the data set indicated in the ordered list, wherein the copies of the data set in the update group comprises the determined number of the copies of the data set in the ordered list from the pointer.

9. The computer program product of claim 8, wherein the operations further comprise:

adjusting the pointer to point to an immediate next of the copies of the data set in the ordered list in response to receiving the update and before the update group is determined and the update is applied.

10. The computer program product of claim 1, wherein the data set comprises a control data set maintaining control information used by a coupling system, coupled to a plurality of processors, to manage shared access to a shared storage by the plurality of the processors.

11. A system for maintaining backup copies of a data set, comprising:

a processor; and
a computer readable storage medium having computer readable program code embodied therein that is executable to perform operations, the operations comprising:
storing a plurality of copies of a data set receiving updates from at least one processing system;
in response to an update to the data set, determining an update group to include at least one copy of the data set that was not in a last determined update group to which a previous update was applied and to exclude at least one copy of the data set that was in the last determined update group;
applying the update to the data set to the copies of the data set in the update group, wherein updates are not applied to the copies of the data set not in the update group; and
in response to a failure event, determining whether to recover the data set from one of the copies of the data set in the update group or one of the copies of the data set not in the update group.

12. The system of claim 11, wherein the operations further comprise:

in response to recovering the data set from a recovered copy of the data set comprising one of the copies of the data set not in the update group, applying at least one previous update to the recovered copy of the data set to bring the recovered copy of the data set to a current version of the data set.

13. The system of claim 11, wherein the determining the update group is performed in response to receiving the update and before applying the update to the copies of the data set in the update group.

14. The system of claim 11, wherein the determining whether to recover the data set from one of the copies in the update group or not in the update group comprises performing in response to the failure event:

determining whether the applying the update to the data set was interrupted;
recovering the data set from one of the copies of the data set in the update group in response to determining that the applying the update to the data set was not interrupted; and
recovering the data set from one of the copies of the data set not in the update group in response to determining that the applying the update to the data set was interrupted.

15. The system of claim 11, wherein the determining whether to recover the data set from one of the copies in the update group or not in the update group comprises performing in response to the failure event:

determining whether the applying the update to the data set was interrupted;
in response to determining that the update was interrupted, determining whether the copies of the data set in the update group are corrupted;
recovering the data set from one of the copies of the data set in the update group in response to determining that the copies of the data set in the update group are not corrupted; and
recovering the data set from one of the copies of the data set not in the update group in response to determining that the copies of the data set in the update group are corrupted.

16. The system of claim 15, wherein the determining whether the copies of the data set in the update group are corrupted comprises:

determining whether the copies of the data set in the update group are identical copies;
determining that the copies of the data set are corrupted in response to determining that the copies of the data set in the update group are not identical; and
determining that the copies of the data set are not corrupted in response to determining that the copies of the data set in the update group are identical.

17. The system of claim 11, wherein the data set comprises a control data set maintaining control information used by a coupling system, coupled to a plurality of processors, to manage shared access to a shared storage by the plurality of the processors.

18. A method backup copies of a data set, comprising:

storing a plurality of copies of a data set receiving updates from at least one processing system;
in response to an update to the data set, determining an update group to include at least one copy of the data set that was not in a last determined update group to which a previous update was applied and to exclude at least one copy of the data set that was in the last determined update group;
applying the update to the data set to the copies of the data set in the update group, wherein updates are not applied to the copies of the data set not in the update group; and
in response to a failure event, determining whether to recover the data set from one of the copies of the data set in the update group or one of the copies of the data set not in the update group.

19. The method of claim 18, further comprising:

in response to recovering the data set from a recovered copy of the data set comprising one of the copies of the data set not in the update group, applying at least one previous update to the recovered copy of the data set to bring the recovered copy of the data set to a current version of the data set.

20. The method of claim 18, wherein the determining the update group is performed in response to receiving the update and before applying the update to the copies of the data set in the update group.

21. The method of claim 18, wherein the determining whether to recover the data set from one of the copies in the update group or not in the update group comprises performing in response to the failure event:
   determining whether the applying the update to the data set was interrupted;
   recovering the data set from one of the copies of the data set in the update group in response to determining that the applying the update to the data set was not interrupted; and
   recovering the data set from one of the copies of the data set not in the update group in response to determining that the applying the update to the data set was interrupted.

22. The method of claim 18, wherein the determining whether to recover the data set from one of the copies in the update group or not in the update group comprises performing in response to the failure event:
   determining whether the applying the update to the data set was interrupted;
   in response to determining that the update was interrupted, determining whether the copies of the data set in the update group are corrupted;
   recovering the data set from one of the copies of the data set in the update group in response to determining that the copies of the data set in the update group are not corrupted; and
   recovering the data set from one of the copies of the data set not in the update group in response to determining that the copies of the data set in the update group are corrupted.

23. The method of claim 22, wherein the determining whether the copies of the data set in the update group are corrupted comprises:
   determining whether the copies of the data set in the update group are identical copies;
   determining that the copies of the data set are corrupted in response to determining that the copies of the data set in the update group are not identical; and
   determining that the copies of the data set are not corrupted in response to determining that the copies of the data set in the update group are identical.

24. The method of claim 18, wherein the data set comprises a control data set maintaining control information used by a coupling system, coupled to a plurality of processors, to manage shared access to a shared storage by the plurality of the processors.

\* \* \* \* \*